(12) United States Patent
Udagawa

(10) Patent No.: US 8,289,740 B2
(45) Date of Patent: Oct. 16, 2012

(54) VOLTAGE REDUCTION DETECTION CIRCUIT AND SWITCHING POWER SUPPLY SYSTEM

(75) Inventor: Kazuhiko Udagawa, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 531 days.

(21) Appl. No.: 12/553,515

(22) Filed: Sep. 3, 2009

(65) Prior Publication Data

US 2010/0061121 A1    Mar. 11, 2010

(30) Foreign Application Priority Data

Sep. 11, 2008 (JP) ................................ 2008-232848

(51) Int. Cl.
*H02H 7/122* (2006.01)
(52) U.S. Cl. .............................. 363/56.11; 363/56.01
(58) Field of Classification Search ............... 363/16, 363/20, 21.01, 52, 53, 55, 56.01, 56.09, 56.11, 363/95, 97, 131
See application file for complete search history.

(56) References Cited

U.S. PATENT DOCUMENTS

| 5,034,728 A * | 7/1991 | Taylor ........................... 340/663 |
| 5,917,714 A * | 6/1999 | Ogawa ............................. 363/20 |
| 6,005,789 A * | 12/1999 | Lee .................................. 363/95 |
| 6,980,445 B2 * | 12/2005 | Fukumoto et al. .............. 363/45 |
| 7,355,864 B2 * | 4/2008 | Matsumoto ................ 363/21.18 |
| 2002/0122320 A1 | 9/2002 | Brkovic ....................... 363/21.08 |
| 2005/0197791 A1 | 9/2005 | Matsumoto ..................... 702/60 |

FOREIGN PATENT DOCUMENTS

| FR | 1567257 | 5/1968 |
| JP | 11-150952 | 6/1999 |
| JP | 11-252907 | 9/1999 |
| JP | 2001-119932 A | 4/2001 |
| JP | 2002-095250 | 3/2002 |
| JP | 2005-124252 A | 5/2005 |
| JP | 2003-153529 A | 5/2009 |
| WO | WO 89/03136 | 4/1989 |

* cited by examiner

*Primary Examiner* — Matthew Nguyen
(74) *Attorney, Agent, or Firm* — Morgan, Lewis & Bockius LLP

(57) ABSTRACT

A voltage reduction detection circuit for a switching power supply includes a first rectifier diode having an anode connected to the output terminal of a secondary winding; a second rectifier diode connected in parallel with the first rectifier diode and having a cathode connected to the output terminal; and resistors arranged to divide the voltage between the cathode side of the first rectifier diode and the anode side of the second rectifier diode. The circuit detects a voltage reduction in an AC power supply (feeding AC power to the switching power supply) based on variation in a voltage resulting from voltage division by the resistors.

10 Claims, 3 Drawing Sheets

VOLTAGE REDUCTION DETECTION CIRCUIT AND SWITCHING POWER SUPPLY SYSTEM

This application is based on Japanese Patent Application No. 2008-232848 filed on Sep. 11, 2008, the contents of which are hereby incorporated by reference.

BACKGROUND OF THE INVENTION

1. Field of the Invention

The present invention relates to a voltage reduction detection circuit that detects a voltage drop (voltage reduction) in an AC (alternating-current) power supply that feeds AC power to a switching power supply. The present invention also relates to a switching power supply system that is provided with such a voltage reduction detection circuit.

2. Description of Related Art

Conventionally, in electronic devices such as television receivers and information recording/playback apparatuses, there are employed compact, high-efficiency switching power supplies, and there are known switching power supplies with various configurations (for example, Patent Documents 1 to 4 listed below). FIG. 5 is a block diagram illustrating an example of a conventional configuration of a switching power supply of the RCC (ringing choke converter) type. As shown in FIG. 5, the conventional switching power supply 100 is provided with a rectifier circuit 101, a switching transformer 102, a switching circuit 103, a secondary rectifier circuit 104, a feedback circuit 105, a photocoupler 106, and a protection circuit 107.

The rectifier circuit 101 converts AC power fed from an AC power supply into DC (direct-current) power. The switching transformer 102 has a primary coil 102a to which a DC voltage obtained from the rectifier circuit 101 is applied and across which a DC current passes as a result, a secondary coil 102b that outputs a voltage corresponding to the voltage applied to the primary coil, and a drive coil 102c that generates a voltage corresponding to the voltage supplied to the primary side of the switching transformer 102. The switching circuit 103 turns on and off the DC voltage applied to the primary side of the switching transformer 102 to output an AC voltage from the secondary side of the switching transformer 102.

The secondary rectifier circuit 104 converts three different AC voltages (high-voltage, medium-voltage, low-voltage, in order from the top) outputted from the secondary side of the switching transformer 102 into DC voltages, respectively. The feedback circuit 105 gives the primary side a feedback based on the magnitudes of the voltages outputted from the secondary rectifier circuit 104 to stabilize the output voltages. The photocoupler 106 has a photodiode 106a and a phototransistor 106b, and supplies the feedback signal from the feedback circuit 105 to the switching circuit 103. The protection circuit 107, when an abnormality such as short circuiting occurs at the secondary side, forcibly stops the switching circuit 103 to stop the DC voltage supplied to the primary side of the switching transformer 102.

When the switching power supply 100 starts to operate, first, AC power fed from an AC power supply (generally a commercial power supply) is converted into DC power by the rectifier circuit 101, and is then fed to the switching transformer 102 via the switching circuit 103. Here, the switching circuit 103 turns the DC voltage on and off that is fed to the switching transformer 102 at a predetermined period, so that the voltage is intermittently supplied to the primary side of the switching transformer 102. At the secondary side of the switching transformer 102, three different AC voltages are generated, and the AC voltages outputted are converted into DC voltages, respectively, by the secondary rectifier circuit 104, so that three different DC voltages are outputted.

The feedback circuit 105 increases and decreases the current that passes through the photodiode 106a in accordance with to the magnitudes of the two outputted voltages, medium-voltage and low-voltage, supplied from the secondary rectifier circuit 104. For example, when a voltage higher than the rated voltage value is outputted at the secondary side, a larger current passes through the photodiode 106a, intensifying the light emission of the photodiode 106a. The intense light is then received at the base of the phototransistor 106b, causing the phototransistor to pass a larger current. Thus, when the current generated from the drive coil 102c flows into the switching circuit 103, a larger current flows into the switching circuit 103. The switching circuit 103 then lengthen the period of stopping the current supplied to the primary side of the switching transformer 102. With the above operation, the voltage generated from the secondary side of the switching transformer 102 is reduced to be closer to the rated voltage value. Note that when a voltage lower than the rated voltage value is outputted at the secondary side, the opposite operation is performed.

The protection circuit 107 forcibly stops the switching circuit 103 when an abnormality such as short circuiting occurs at the secondary side as described above. The protection circuit 107 also has a latch function so that when a stop as described above (also referred to as a "latch stop") occurs, the switching function is kept stopped until the power supply at the primary side of the switching transformer is turned on again. In other words, when a latch stop occurs, unless the AC cable is disconnected once and a recovery is made from the abnormality, normal oscillation is not resumed.

The latch stop is provided originally as a function for coping with problems such as short circuiting occurring at the secondary side. However, in the conventional switching power supply 100, the latch stop may result even when a voltage drop occurs in a commercial power supply, or when momentary power failure (the voltage value of zero) occurs. Momentary power failure occurs occasionally with commercial power supplies; if a latch stop is invoked whenever it occurs, users may think that there must be a trouble, which is undesirable. Note that phenomena such as a voltage drop and momentary power failure in the AC power supply (commercial power supply) feeding AC power to the switching power supply are hereinafter collectively referred to as "voltage reduction."

In view of the foregoing, to prevent a latch stop from being caused by a voltage reduction, an IC (integrated circuit) that monitors the voltage level of the AC power may be provided at the primary side so that the control signal for switching is stopped only when the voltage there falls to or below a predetermined threshold level (which needs to be higher than the voltage at which a latch stop occurs) (see, for example, Patent Document 1). With this configuration, it is possible, on one hand, to prevent a latch stop from being caused by a voltage reduction and, on the other hand, to invoke a latch stop when a problem such as short circuiting occurs at the secondary side.

However, providing such an IC at the primary side with a view to detecting voltage reduction in the AC power supply causes an increase in the manufacturing cost of the switching power supply, which is undesirable. Moreover, the IC so provided occupies a large space in the circuit, which is undesirable.

Patent Document 1: JP-A-2005-124252 Publication
Patent Document 2: JP-A-2003-153529 Publication
Patent Document 3: JP-A-2001-119932 Publication
Patent Document 4: JP-A-11-252907 Publication It is therefore an object of the present invention to provide a voltage reduction detection circuit for a switching power supply that can detect a voltage reduction in an AC power supply at low cost. It is another object of the present invention to provide a switching power supply system that is provided with such a voltage reduction detection circuit and that can, while avoiding a latch stop invoked by a voltage reduction in an AC power supply, perform a latch stop when short circuiting etc. occurs at the secondary side.

SUMMARY OF THE INVENTION

To achieve the above objects, a voltage reduction detection circuit according to the present invention detects a voltage reduction in an AC power supply for a switching power supply that converts AC power fed from the AC power supply into DC power, then switches the DC power passing across a primary winding of a switching transformer to generate AC power in a secondary winding of the switching transformer, and then rectifies and smoothes the AC power to output a predetermined DC voltage. The voltage reduction detection circuit is provided with a first rectifier diode having the anode connected to the output terminal of the secondary winding; a second rectifier diode connected in parallel with the first rectifier diode and having the cathode connected to the output terminal; and resistors arranged to divide the voltage between the cathode side of the first rectifier diode and the anode side of the second rectifier diode. In the voltage reduction detection circuit, a voltage reduction in the AC power supply is detected based on variation in a voltage resulting from voltage division by the resistors.

With the configuration according to the present invention, in a conventional switching power supply, simply by adding not expensive components such as ICs but inexpensive circuit components (rectifier diodes, resistors, etc.) at the secondary side, it is possible to detect a voltage reduction in the AC power supply. Thus it is possible to achieve a switching power supply that can detect a voltage reduction in the AC power supply with reduce cost.

Moreover, to achieve the above objects, a switching power supply system according to the invention is provided with the voltage reduction detection circuit with the above-described configuration, an AC power supply, and a switching power supply that converts AC power fed from the AC power supply into DC power, then switches the DC power passing across a primary winding of a switching transformer to generate AC power in a secondary winding of the switching transformer, and then rectifies and smoothes the AC power to output a predetermined DC voltage. When the voltage reduction detection circuit detects that voltage of the AC power supply has fallen below a predetermined voltage level, electric power supplied from the AC power supply to the switching power supply is interrupted.

With this configuration, when a voltage reduction occurs in the AC power supply and the voltage falls below a predetermined voltage level, it is detected by the voltage reduction detection circuit, and then the electric power supplied from the AC power supply to the switching power supply is interrupted. With this configuration, if the predetermined voltage level is set higher than a voltage level at which a latch stop occurs in the switching power supply, it is possible, when there is a voltage reduction in the AC power supply, to stop the operation of the switching power supply before a latch stop occurs in the switching power supply. In this way, it is possible to realize a switching power supply system that, on one hand, can prevent a latch stop from being caused by a voltage reduction in a power supply and that, on the other hand, can invoke a latch stop when a problem such as short circuiting occurs at the secondary side.

Moreover, to achieve the above objects, the switching power supply system according to the invention is provided with an AC power supply; a switching power supply that converts AC power fed from the AC power supply into DC power, then switches the DC power passing across a primary winding of a switching transformer to generate AC power in a secondary winding of the switching transformer, and then rectifies and smoothes the AC power to output a predetermined DC voltage; an on/off portion that turns on and off the electric power supplied from the AC power to the switching power supply; a voltage reduction detection circuit that detects a voltage reduction in the AC power supply by use of a positive voltage and a negative voltage generated in the secondary winding; a control portion that performs control such that the on/off portion switches off when the voltage reduction detection circuit detects that the voltage of the AC power supply has fallen below a predetermined voltage level; and a control portion power supply that drives the control portion.

With this configuration, when a voltage reduction occurs in the AC power supply and the voltage falls below a predetermined voltage level, it is detected by the voltage reduction detection circuit. When a voltage reduction is detected, the electric power supplied from the AC power supply to the switching power supply is interrupted by the on/off portion (for example, a relay) controlled by the control portion (for example, a microcomputer). With this configuration, if the predetermined voltage level is set higher than a voltage level at which a latch stop occurs in the switching power supply, it is possible, when there is a voltage reduction in the AC power supply, to stop the operation of the switching power supply before a latch stop occurs in the switching power supply. In this way, it is possible to realize a switching power supply system that, on one hand, can prevent a latch stop from being caused by a voltage reduction in a power supply and that, on the other hand, can invoke a latch stop when a problem such as short circuiting occurs at the secondary side. Moreover, in this configuration, as the control portion controlling the on/off portion and the control portion power supply driving the former, components provided for reducing standby electric power consumption may be used; thus, it is possible to realize, with reduced cost, a configuration for achieving the effects described above.

In the configuration described above, it is preferable that a voltage reduction detection circuit be provided with a first rectifier diode having the anode connected to the output terminal of the secondary winding; a second rectifier diode connected in parallel with the first rectifier diode and having the cathode connected to the output terminal; and resistors arranged to divide the voltage between the cathode side of the first rectifier diode and the anode side of the second rectifier diode. It is also preferable that a voltage reduction in the AC power supply be detected based on variation in a voltage resulting from voltage division by the resistors. This configuration allows fabrication with reduced cost, and is suitable for a switching power supply system exhibiting the effects described above.

In the switching power supply system with the configuration described above, the control portion power supply may be a switching power supply that uses the AC power supply as an electric power source but that is separate from the switching power supply. As mentioned above, there is a switching power supply system provided with a transformer with a small rated capacity as a sub power supply for a main switching power supply, as a measure for reducing standby electric power consumption, and this power supply may be used as a power supply for the control portion controlling the on/off portion.

According to the present invention, it is possible to provide, with a reduced cost, a voltage reduction detection circuit for a switching power supply that can detect a voltage reduction in an AC power supply. Moreover, by including such a voltage reduction detection circuit, it is possible to provide a switching power supply system that, on one hand, can prevent a latch stop from being caused by a voltage reduction in a power supply and that, on the other hand, can invoke a latch stop when a problem such as short circuiting occurs at the secondary side.

DETAILED DESCRIPTION OF PREFERRED EMBODIMENTS

A voltage reduction detection circuit for a switching power supply and a switching power supply system employing such a voltage reduction detection circuit embodying the present invention will now be described with reference to the accompanying drawings.

Figure 1:
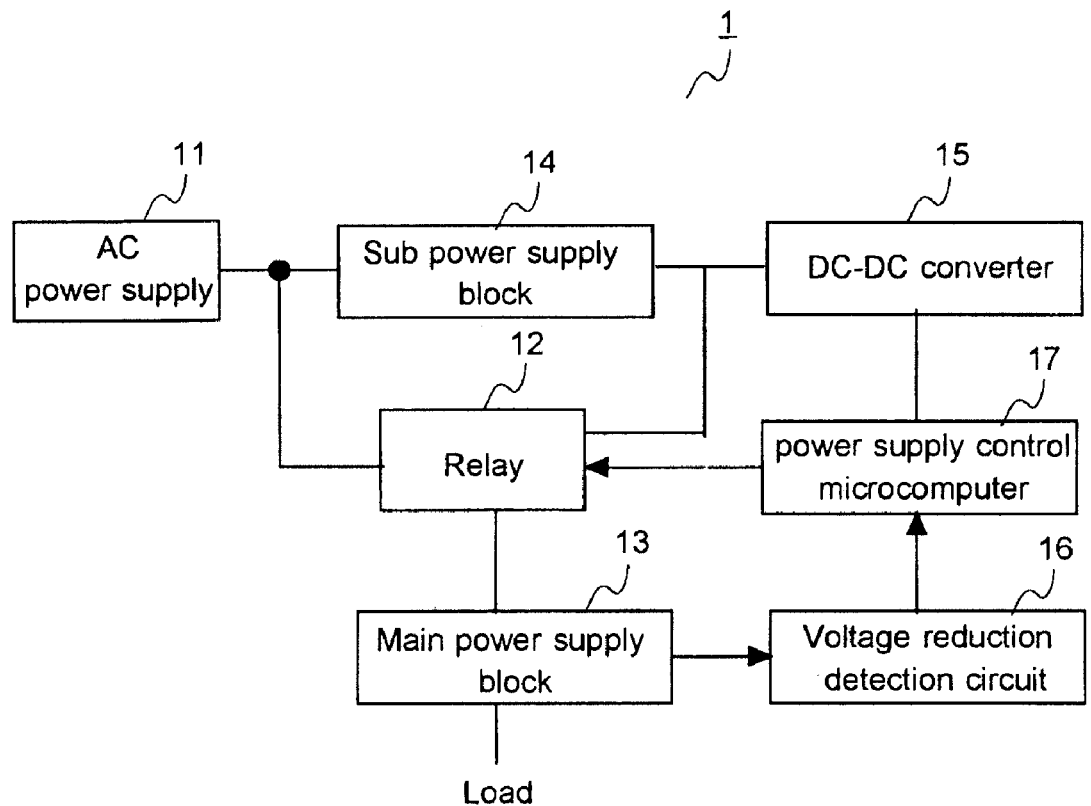
FIG. 1 is a block diagram showing the configuration of a switching power supply system according to an embodiment of the present invention.

FIG. 1 is a block diagram showing the configuration of the switching power supply system according to the embodiment. As shown in FIG. 1, the switching power supply system 1 according to the embodiment is provided with an AC power supply 11, a relay 12, a main power-supply block 13, a sub power-supply block 14, a DC-DC converter 15, a voltage reduction detection circuit 16, and a power-supply control microcomputer 17.

As the AC power supply 11, a commercial power supply is typically used; as the voltage of that power supply, for example, any voltage from 100 V to 240 V is assumed.

The relay 12 is connected between the AC power supply 11 and the main power-supply block 13, and turns on and off the electric power supplied from the AC power supply 11 to the main power-supply block 13. The relay 12 is connected for the purpose of stopping (turning off) the electric power supplied to the main power-supply block 13, at a predetermined timing, when a voltage reduction occurs in the AC power supply 11. In the embodiment, the source voltage for the relay 12 is obtained from the sub power-supply block 14. Note that the relay is one example of an "on/off portion" according to the present invention.

Figure 5:
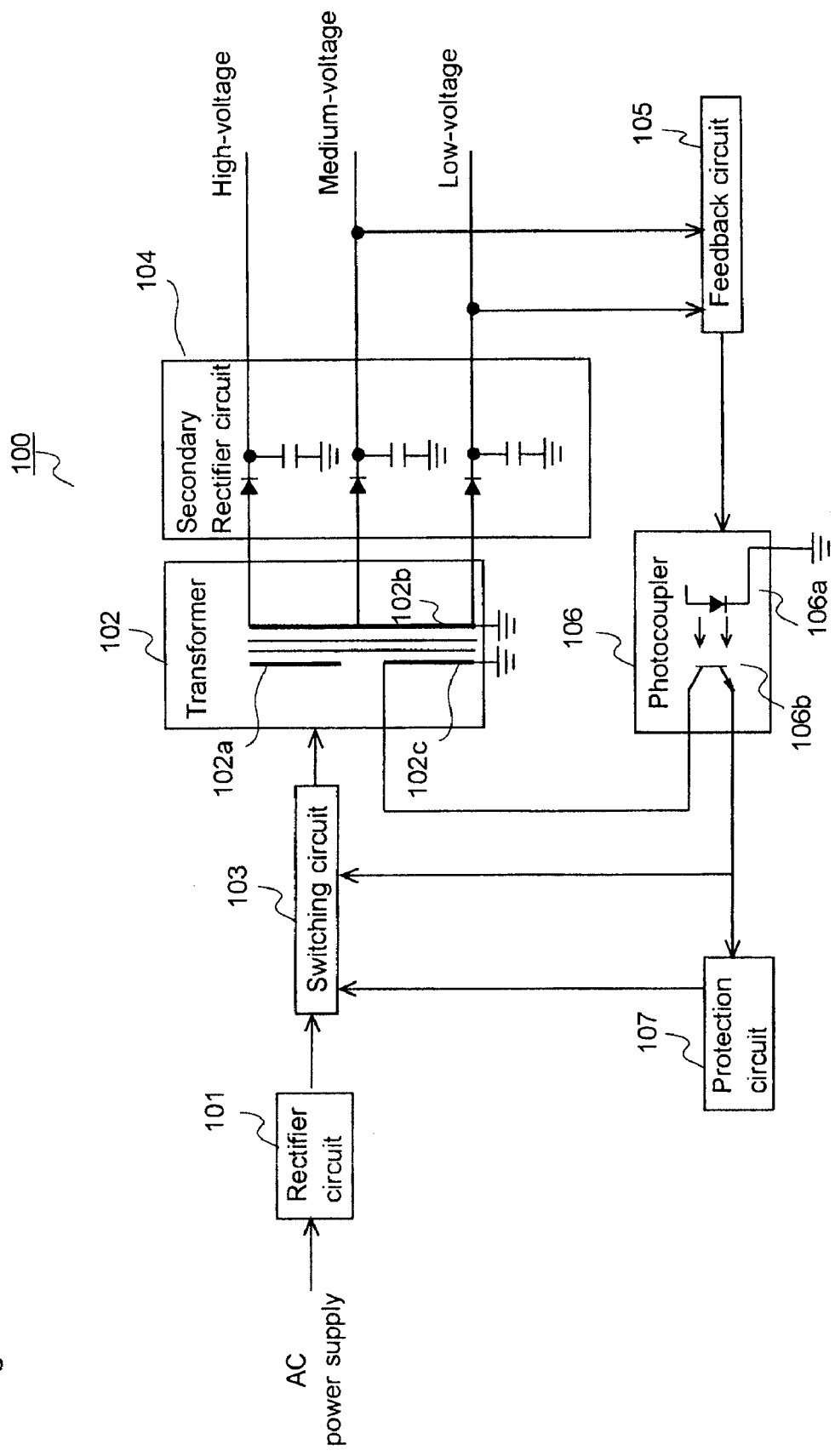
FIG. 5 is a block diagram illustrating an example of a conventional configuration of a switching power supply of the RCC type.

The main power-supply block 13 is configured with an RCC switching power supply having a switching transformer with a large capacity (for example, a rated capacity of 50 W). The switching power supply has a configuration like that of the conventional RCC switching power supply 100 shown in FIG. 5. Specifically, the main power-supply block 13 can supply, for example, DC 12 V, 5 V, and 2.5 V at the secondary side. The output lines of the DC voltages are connected to various circuits (loads) provided in an electronic device.

Moreover, the main power-supply block 13 is provided with a protection circuit (see FIG. 5) having a latch function, which invokes a latch stop when short circuiting etc. occurs at the secondary side. However, if a latch stop occurs when there is a voltage reduction in the AC power supply 11, it is inconvenient as described previously. Thus, the switching power supply system 1 according to the embodiment is so configured as to prevent a latch stop from being caused by a voltage reduction in the AC power supply 11. The function for preventing a latch stop caused by a voltage reduction in the AC power supply 11 will be described later.

The sub power-supply block 14 is configured with an RCC switching power supply having a switching transformer with a small capacity (for example, a rated capacity of 1 W or less). This switching power supply also has a configuration basically like that of the conventional RCC switching power supply 100 shown in FIG. 5, except for not having a latch function. The sub power-supply block 14 is used as a power supply for the power-supply control microcomputer 17, and is one example of a "control portion power supply" according to the present invention.

The sub power-supply block 14 functions as a power supply for the power-supply control microcomputer 17 as described above. However, in the embodiment, the sub power-supply block 14 is not provided for this purpose alone, but is provided separately from the main power-supply block 13 for reducing standby electric power consumption when an electronic device (for example, a Blu-ray Disc player, a television receiver, etc.) provided with the switching power supply system 1 is in a standby state.

It is preferable that the main power-supply block 13 and the sub power-supply block 14 share a single rectifier circuit that converts AC power fed from the AC power supply 11 into DC power. Specifically, it is preferable that AC power fed from the AC power supply 11 be converted into DC power in the rectifier circuit and then the obtained DC power be distributed between the main power-supply block 13 and the sub power-supply block 14.

The DC-DC converter 15 converts the DC voltage outputted from the sub power-supply block 14 to a voltage corresponding to the power-supply control microcomputer 17. For example, the DC-DC converter 15 converts DC 5 V outputted from the sub power-supply block 14 to 3.3 V.

Figure 2:
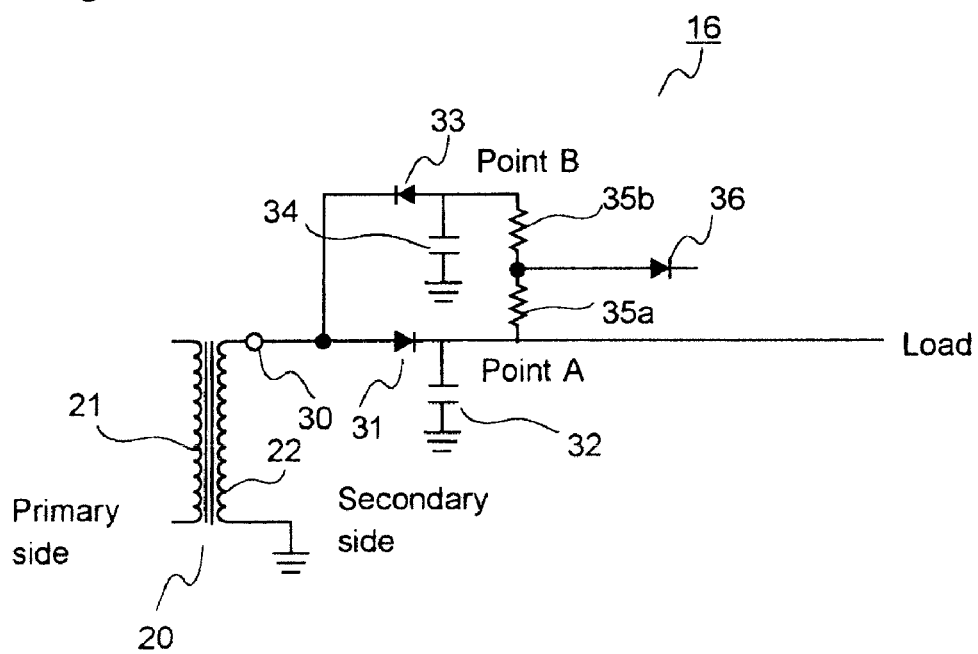
FIG. 2 is a circuit diagram showing the configuration of a voltage reduction detection circuit provided in the switching power-supply system according to the embodiment.

The voltage reduction detection circuit 16 is a circuit that detects a voltage reduction in the AC power supply 11. In the switching power-supply system 1 according to the embodiment, the voltage reduction detection circuit 16 is provided to detect the voltage of the AC power supply 11 falling below a predetermined voltage. FIG. 2 is a circuit diagram showing the configuration of a voltage reduction detection circuit provided in the switching power-supply system 1 according to the embodiment.

As shown in FIG. 2, the voltage reduction detection circuit 16 is provided with a first rectifier diode 31, a first capacitor 32, a second rectifier diode 33, a second capacitor 34, two resistors 35a and 35b, and a third rectifier diode 36.

The anode of the first rectifier diode 31 is connected to an output terminal 30 for outputting DC 5 V, which is one of three output terminals (FIG. 2 is a simplified diagram showing the one terminal for DC 5 V alone) provided at a secondary coil 22 of a switching transformer 20 provided in the main power-supply block 13. One end of the first capacitor 32 is connected to the cathode of the first rectifier diode 31 and the other end of the first capacitor 32 is grounded. The first rectifier diode 31 and the first capacitor 32 constitute a secondary rectifying/smoothing circuit as is typically provided for outputting a DC voltage from the secondary side in a switching power supply.

The second rectifier diode 33 is connected parallel with the first rectifier diode 31 with respect to the output terminal 30 for outputting DC 5 V. In addition, the cathode of the second rectifier diode 33 is connected to the output terminal 30 for outputting DC 5 V. One end of the second capacitor 34 is connected to the anode of the second rectifier diode 33, and the other end of the second capacitor 34 is grounded.

One end of the resistor 35a is connected to the connection node between the first rectifier diode 31 and the first capacitor 32. One end of the resistor 35b is connected to the connection node between the second rectifier diode 33 and the second capacitor 34. The other end of the resistor 35a and the other end of the resistor 35b are connected together. The resistors 35a and 35b are provided for dividing the voltage between point A (at the cathode side of the first rectifier diode 31) and point B (at the anode side of the second rectifier diode 33) in FIG. 2.

The anode of the third rectifier diode 36 is connected to the connection node between the resistors 35a and 35b. The third rectifier diode 36 is provided for preventing a current from flowing when the potential of the connection node between the resistors 35a and 35b is negative.

Figure 3:
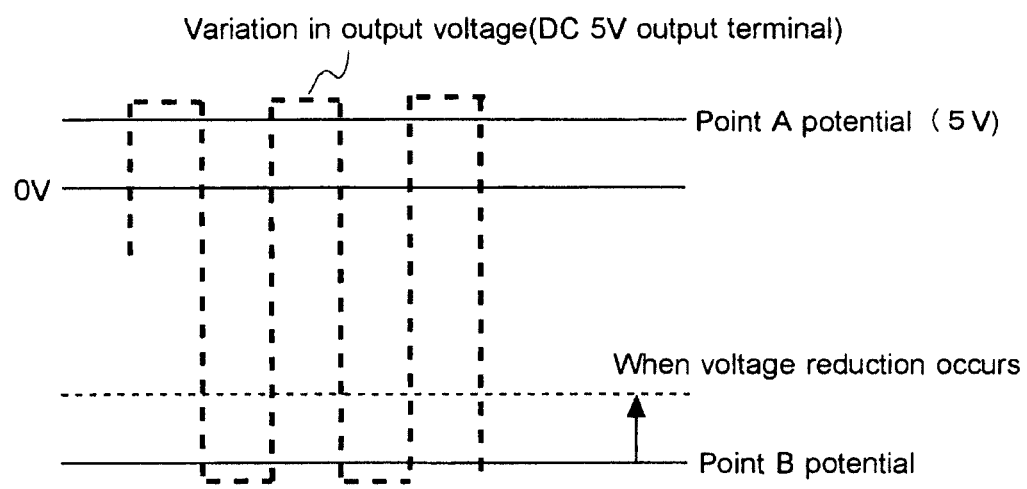
FIG. 3 is a diagram illustrating the operating principle by which the voltage reduction detection circuit according to the embodiment can detect a voltage reduction in an AC power supply.

FIG. 3 is a diagram illustrating the operating principle by which the voltage reduction detection circuit 16 according to the embodiment can detect a voltage reduction in the AC power supply 11. With reference to FIG. 3, a description will be given of the operation principle by which the voltage reduction detection circuit 16 shown in FIG. 2 can detect a voltage reduction in the AC power supply 11.

A broken line in FIG. 3 shows the variation of the output voltage at the output terminal 30 for outputting DC 5 V (see FIG. 2) of the secondary coil 22 of the switching transformer 20. At the time of switching operation, during an accumulating period (the period in which a voltage is applied to the primary coil 21 (see FIG. 2) of the switching transformer 20) of the switching transformer 20, a voltage (negative voltage) that reflects the primary side voltage in the inverted fashion is outputted to the output terminal 30. On the other hand, during a discharging period (the period in which no voltage is applied to the primary coil 21 of the switching transformer 20) of the switching transformer 20, a voltage (positive voltage, +5 V here) corresponding to the turns ratio between the primary coil 21 and the secondary coil 22 is outputted to the output terminal 30. Thus, variation of the output voltage as shown in FIG. 3 is observed.

Here, point A in FIG. 2 has a potential of 5 V due to the presence of the first rectifier diode 31. On the other hand, point B in FIG. 2 has a predetermined negative potential corresponding to the voltage of the AC power supply 11 due to the presence of the second rectifier diode 33. Note that it is assumed here that the voltage is supplied normally by the AC power supply 11.

When a voltage reduction occurs in the AC power supply 11, the positive voltage is so controlled that its value (+5 V here) is kept at a predetermined value (5 V) due to the presence of a feedback circuit, and thus the voltage does not vary greatly immediately. On the other hand, the absolute value of the negative voltage, in part to help keep the positive voltage constant, becomes smaller. Specifically, as shown in FIG. 3, the potential at point B rises (the absolute value of the potential becomes smaller) when a voltage reduction occurs in the AC power supply 11.

Thus, when a voltage reduction occurs in the AC power supply 11, the voltage resulting from voltage division by the resistors 35a and 35b varies. Not until the potential of the connection node between the resistors 35a and 35b reaches a predetermined potential at the positive side does a current start to pass through the third rectifier diode 36. Thus, monitoring the current makes it possible to detect a voltage reduction. To be specific, by adjusting the resistance ratio between the resistors 35a and 35b such that the potential of the connection node between the resistors 35a and 35b is a predetermined potential at the positive side when the voltage of the AC power supply 11 falls below a predetermined level, it is possible to detect the voltage of the AC power supply 11 falling below a predetermined level.

Returning to FIG. 1, when the power-supply control microcomputer 17 recognizes, by the signal obtained from the voltage reduction detection circuit 16, that the voltage of the AC power supply 11 has fallen below a predetermined level, the power-supply control microcomputer 17 outputs a signal to the relay 12 to switch from on to off. Thus, the power-supply control microcomputer 17 functions as a control portion controlling the relay 12.

Figure 4:
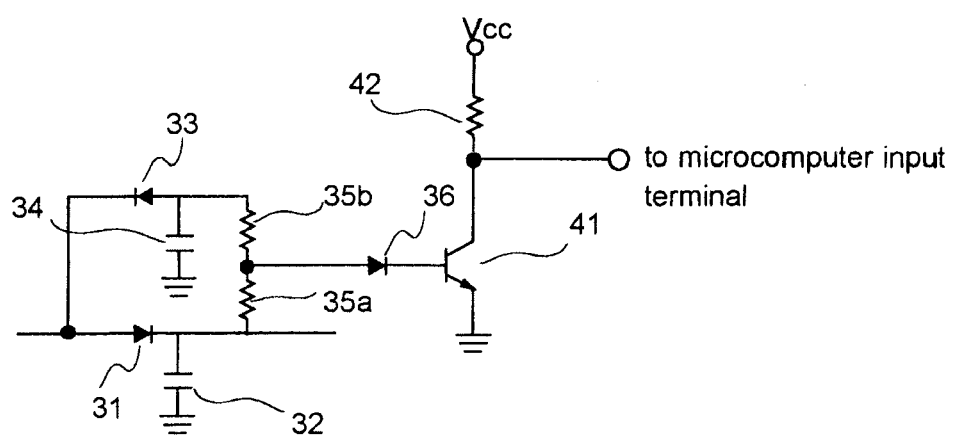
FIG. 4 is a diagram showing the circuitry so configured that a power-supply control microcomputer according to the embodiment can recognize, by the signal from the voltage reduction detection circuit, that the voltage of the AC power supply has fallen below a predetermined level.

Here, a description will be given of the configuration that permits the power-supply control microcomputer 17 to recognize, by the signal obtained from the voltage reduction detection circuit 16, that the voltage of the AC power supply 11 has fallen below a predetermined level. FIG. 4 is a diagram showing the circuitry so configured that the power-supply control microcomputer 17 can recognize, by the signal obtained from the voltage reduction detection circuit 16, that the voltage of the AC power supply 11 has fallen below a predetermined level. Note that FIG. 4 also shows the voltage reduction detection circuit 16.

As shown in FIG. 4, the base of the transistor 41 is connected to the cathode of the third rectifier diode 36 of the voltage reduction detection circuit 16. The emitter of the transistor 41 is grounded, and the collector of the transistor 41 is connected to the input terminal of the power-supply control microcomputer 17 and to Vcc (for example, 3.3 V) via a pull-up resistor 42.

When the voltage of the AC power supply 11 is normal, no current passes through the third rectifier diode 36 of the voltage reduction detection circuit 16, keeping the transistor 41 off. In this case, a H (high) level is fed to the input terminal of the power-supply control microcomputer 17. On the other hand, when the voltage of the AC power supply 11 is reduced and falls below a predetermined level, a current passes through the third rectifier diode 36 of the voltage reduction detection circuit 16, turning the transistor 41 on. This allows an L (low) level to be fed to the input terminal of the power-supply control microcomputer 17. When fed with the L level, the power-supply control microcomputer 17 recognizes that the voltage of the AC power supply 11 has been lowered and fallen below a predetermined level.

The configuration specifically described above is not meant to limit the configuration that permits the power-supply control microcomputer 17 to recognize, by the signal obtained from the voltage reduction detection circuit 16, that the voltage of the AC power supply 11 has fallen below a predetermined level. For example, the cathode of the third rectifier diode 36 of the voltage reduction detection circuit 16 and the AD (analog-to-digital) conversion port of the power-supply control microcomputer 17 may be directly connected together so that the power-supply control microcomputer 17 may recognize that the voltage of the AC power supply 11 has fallen below a predetermined voltage level by monitoring the potential at the AD conversion port.

Moreover, the power-supply control microcomputer 17 has the function of performing control such that the relay 12 switches off when the power-supply control microcomputer 17 recognizes that the voltage of the AC power supply 11 has fallen below a predetermined voltage level, as described above. However, in the embodiment, the power-supply control microcomputer 17 is provided not for this purpose alone, but also for controlling the entire operation of an electronic device provided with the switching power supply system 1 when the device is in a standby state.

As described above, in the switching power supply system 1 according to the embodiment, when a voltage reduction occurs in the AC power supply 11 and the voltage falls below a predetermined voltage level, it is detected by the voltage reduction detection circuit 16. Then, in response to a signal from the voltage reduction detection circuit 16, the power-supply control microcomputer 17 outputs an "off" command to the relay 12 to interrupt the electric power supplied from the AC power supply 11 to the main power-supply block 13.

Configuring as described above is for preventing a latch stop in the main power-supply block 13 being caused by a voltage reduction in the AC power-supply 11 as described above. To achieve this, the above-mentioned interruption of the electric power supplied from the AC power supply 11 to the main power-supply block 13 needs to be done, before a latch stop occurs. For example, suppose that the voltage of the AC power supply 11 under normal condition is 100 V, and that a latch stop occurs when the voltage of the AC power supply 11 is about 30 V. In this case, for example, it is preferable that the voltage reduction detection circuit detect the voltage of the AC power supply 11 falling to 60 V or less (for example), which is a voltage sufficiently higher than 30 V but sufficiently lower than the voltage under normal condition, to interrupt then the electric power supplied from the AC power supply 11 to the main power-supply block 13.

With the voltage reduction detection circuit 16 according to the embodiment, simply by adding components such as rectifier diodes, resistors, and capacitors to the configuration of a conventional switching power supply, it is possible to detect a voltage reduction in the AC power supply 11; thus it is possible to reduce cost compared with when a voltage reduction is detected by use of an IC. Also, by using the voltage reduction detection circuit 16, it is possible to realize a switching power supply system like the switching power supply system 1 according to the embodiment that, on one hand, can prevent a latch stop from being caused by a voltage reduction in a power supply and that, on the other hand, can invoke a latch stop when a problem such as short circuiting occurs at the secondary side. Moreover, in the switching power supply system 1 according to the embodiment, the sub power-supply block 14 and the power-supply control microcomputer 17 are introduced to be used for other purposes also. Thus, it is possible to configure the switching power supply system 1 according to the embodiment with reduced cost.

It is to be understood that the embodiments described above are merely examples of the present invention, and are not meant to limit the present invention, which allows many variations and modifications within the scope not departing from the spirit of the invention.

For example, the above-described embodiment deals with a configuration in which the main power-supply block 13 outputs three different DC voltages. However, this is not meant to limit the invention, and the main power-supply block may output any number of DC voltages so long as it is one or more. Moreover, although the embodiment deals with a configuration in which the voltage reduction detection circuit 16 is connected to the DC 5 V line, it is also possible, instead, to connect the voltage reduction detection circuit to an output line outputting another voltage (DC 12 V or DC 3.3 V).

Moreover, in the above-described embodiment, although the sub power-supply block 14 is used as an RCC switching power supply, this is not meant to limit the invention. It is possible to use instead any other type of power supply, even a battery etc. as the case may be, so long as it drives the power-supply control microcomputer 17.

Moreover, the above-described embodiment deals with a configuration in which the main power-supply block provided in the switching power-supply system 1 is an RCC switching power supply. However, this is not meant to limit the invention, and in cases where the main power-supply block is a flyback switching power supply, the present invention can be applied widely.

The present invention can be applied suitably to switching power supplies of a flyback type.

What is claimed is:

1. A voltage reduction detection circuit that detects a voltage reduction in an AC power supply for a switching power supply, the switching power supply converting AC power fed from the AC power supply into DC power, then switching the DC power passing across a primary winding of a switching transformer to generate AC power in a secondary winding of the switching transformer, and then rectifying and smoothing the AC power to output a predetermined DC voltage, the voltage reduction detection circuit comprising:
a first rectifier diode having an anode connected to an output terminal of the secondary winding;
a second rectifier diode connected in parallel with the first rectifier diode and having a cathode connected to the output terminal; and
resistors arranged to divide a voltage between a cathode side of the first rectifier diode and an anode side of the second rectifier diode,
wherein the voltage reduction in the AC power supply is detected based on variation in a voltage resulting from voltage division by the resistors.

2. A switching power supply system comprising the voltage reduction detection circuit according to claim 1, further comprising:
an AC power supply; and
a switching power supply converting AC power fed from the AC power supply into DC power, then switching the DC power passing across a primary winding of a switching transformer to generate AC power in a secondary winding of the switching transformer, and then rectifying and smoothing the AC power to output a predetermined DC voltage,
wherein when the voltage reduction detection circuit detects that voltage of the AC power supply has fallen below a predetermined voltage level, electric power supplied from the AC power supply to the switching power supply is interrupted.

3. The switching power supply system according to claim 2, wherein the predetermined voltage level is set higher than a voltage level at which a latch stop occurs in the switching power supply.

4. A switching power supply system comprising:
an AC power supply;
a switching power supply converting AC power fed from the AC power supply into DC power, then switching the DC power passing across a primary winding of a switching transformer to generate AC power in a secondary winding of the switching transformer, and then rectifying and smoothing the AC power to output a predetermined DC voltage;

an on/off portion turning on and off electric power supplied from the AC power supply to the switching power supply;

a voltage reduction detection circuit detecting a voltage reduction in the AC power supply by use of a positive voltage and a negative voltage generated in the secondary winding;

a control portion performing control such that the on/off portion switches off when the voltage reduction detection circuit detects that the voltage of the AC power supply has fallen below a predetermined voltage level; and a control portion power supply driving the control portion, wherein the voltage reduction detection circuit comprises:

a first rectifier diode having an anode connected to an output terminal of the secondary winding;

a second rectifier diode connected in parallel with the first rectifier diode and having a cathode connected to the output terminal; and, resistors arranged to divide a voltage between a cathode side of the first rectifier diode and an anode side of the second rectifier diode, wherein a voltage reduction in the AC power supply is detected based on variation in a voltage resulting from voltage division by the resistors.

5. The switching power supply system according to claim 4, wherein the predetermined voltage level is set higher than a voltage level at which a latch stop occurs in the switching power supply.

6. The switching power supply system according to claim 4, wherein the predetermined voltage level is set higher than a voltage level at which a latch stop occurs in the switching power supply.

7. The switching power supply system according to claim 4, wherein the control portion power supply is a switching power supply that uses the AC power supply as an electric power source but that is separate from the switching power supply.

8. The switching power supply system according to claim 4, wherein the control portion power supply is a switching power supply that uses the AC power supply as an electric power source but that is separate from the switching power supply.

9. The switching power supply system according to claim 5, wherein the control portion power supply is a switching power supply that uses the AC power supply as an electric power source but that is separate from the switching power supply.

10. The switching power supply system according to claim 6, wherein the control portion power supply is a switching power supply that uses the AC power supply as an electric power source but that is separate from the switching power supply.

* * * * *